(12) United States Patent
Riley et al.

(10) Patent No.: US 6,932,854 B2
(45) Date of Patent: Aug. 23, 2005

(54) METHOD FOR PRODUCING LOW CARBON STEEL

(75) Inventors: Michael Francis Riley, Greenwood, IN (US); William John Mahoney, East Aurora, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 10/762,298

(22) Filed: Jan. 23, 2004

(65) Prior Publication Data

US 2005/0160876 A1   Jul. 28, 2005

(51) Int. Cl.⁷ ............................................... C21C 5/32
(52) U.S. Cl. .................................................. 75/544
(58) Field of Search ...................................... 75/554

(56) References Cited

U.S. PATENT DOCUMENTS

| | | | |
|---|---|---|---|
| 4,373,949 A | 2/1983 | Spruell et al. | 75/60 |
| 4,397,685 A | 8/1983 | Maddever et al. | 75/60 |
| 5,814,125 A | 9/1998 | Anderson et al. | 75/414 |
| 6,125,133 A | 9/2000 | Mathur et al. | 373/8 |
| 6,176,894 B1 | 1/2001 | Anderson et al. | 75/414 |
| 6,241,510 B1 | 6/2001 | Anderson et al. | 431/8 |
| 6,432,163 B1 | 8/2002 | Sarma et al. | 75/414 |
| 6,604,937 B1 | 8/2003 | Mahoney | 431/8 |
| 6,773,484 B2 * | 8/2004 | Mahoney et al. | 75/414 |

* cited by examiner

Primary Examiner—Melvyn Andrews
(74) Attorney, Agent, or Firm—Stanley Ktorides

(57) ABSTRACT

A method for producing low carbon steel wherein molten steel is decarburized in a three stage refining procedure comprising a first stage wherein oxygen is provided for decarburization enveloped in a gas shroud, a second stage wherein oxygen is provided for decarburization enveloped in a flame shroud, and a third stage wherein inert gas or oxygen and inert gas is provided enveloped in a flame shroud.

18 Claims, 3 Drawing Sheets

METHOD FOR PRODUCING LOW CARBON STEEL

TECHNICAL FIELD

This invention relates generally to steelmaking wherein oxygen is provided to molten steel from above the surface of the molten steel and, more particularly, to the employment of such procedure for the production of low carbon steel.

BACKGROUND ART

The basic oxygen furnace (BOF) is a well-known steelmaking method used to produce most of the world's high-quality low carbon steel. The BOF process uses molten iron from a blast furnace as the primary iron source. Because of the nature of the blast furnace process, this molten blast furnace iron is saturated with dissolved carbon. In the BOF process, this molten iron is charged along with steel scrap into an open-top converter. A water-cooled lance is inserted through the top opening and oxygen is blown from the lance in multiple jets toward the molten metal. This oxygen burns the carbon contained in the molten iron, melting the scrap, and creating a bath of liquid steel.

The rate at which carbon is burned by the oxygen determines the productivity of the BOF process. When the partially refined liquid steel contains more than about 0.30 weight percent dissolved carbon, carbon oxidation occurs as quickly as oxygen can be blown through the lance to the liquid steel bath. Below about 0.30 weight percent carbon, however, the rate of carbon oxidation depends on the transport of dissolved carbon from the bulk of the steel bath to the area where the oxygen jet impacts the bath.

One problem with the conventional BOF process is that stirring and mixing in the bulk steel bath are relatively poor. As a result, below about 0.30 weight percent carbon, transport of carbon from the bulk bath to the reaction zone is slow and decarburization is inefficient. An increasing quantity of oxygen reacts with the metal rather than with the carbon as the carbon content decreases. Metallic oxidation results in loss to the slag of valuable elements such as iron and manganese. Such metallic oxidation is also costly because oxygen is consumed in excess of the steel making requirements, and the time to complete refining of the bath is increased. Furthermore, oxidation of other metallic alloying materials may lessen steel quality and increase the amount of costly re-alloying that is required. Excess metallic oxidation will also increase the temperature of the melt and the oxide content of the slag, both of which are detrimental to the refractory lining of the refining vessel. All of these problems reduce the efficiency and increase the cost of the BOF process.

Accordingly, it is an object of this invention to provide an improved top blowing process, such as an improved BOF process, for the production of low carbon steel.

SUMMARY OF THE INVENTION

The above and other objects, which will become apparent to those skilled in the art upon a reading of this disclosure, are attained by the present invention, one aspect of which is:

A method for producing low carbon steel comprising the following sequential refining stages:
(A) providing oxygen in at least one stream enveloped in a gas shroud from a lance to molten steel having a carbon concentration greater than 0.30 weight percent; thereafter
(B) providing oxygen in at least one stream enveloped in a flame shroud from the lance to the molten steel; and thereafter
(C) providing oxygen and inert gas in at least one stream enveloped in a flame shroud from the lance to the molten steel;
said refining stages serving to produce low carbon steel.

Another aspect of the invention is:

A method for producing low carbon steel comprising the following sequential refining stages:
(A) providing oxygen in at least one stream enveloped in a gas shroud from a lance to molten steel having a carbon concentration greater than 0.30 weight percent; thereafter
(B) providing oxygen in at least one stream enveloped in a flame shroud from the lance to the molten steel; and thereafter
(C) providing inert gas in at least one stream enveloped in a flame shroud from the lance to the molten steel;
said refining stages serving to produce low carbon steel.

As used herein the term "low carbon steel" means steel having a carbon concentration less than 0.10 weight percent.

As used herein the term "inert gas" means one or more of argon, nitrogen, carbon monoxide, carbon dioxide and helium.

As used herein the term "gas shroud" means a non-combusting gaseous envelope around and along one or more gas streams.

As used herein the term "flame shroud" means a combusting gaseous envelope around and along one or more gas streams.

As used herein the term "coherent jet" means a supersonic gas stream which has little or no increase in diameter in its flow direction.

As used herein the term "conventional jet" means a supersonic gas stream which has an increase in diameter in its flow direction.

DETAILED DESCRIPTION

Figure 1:
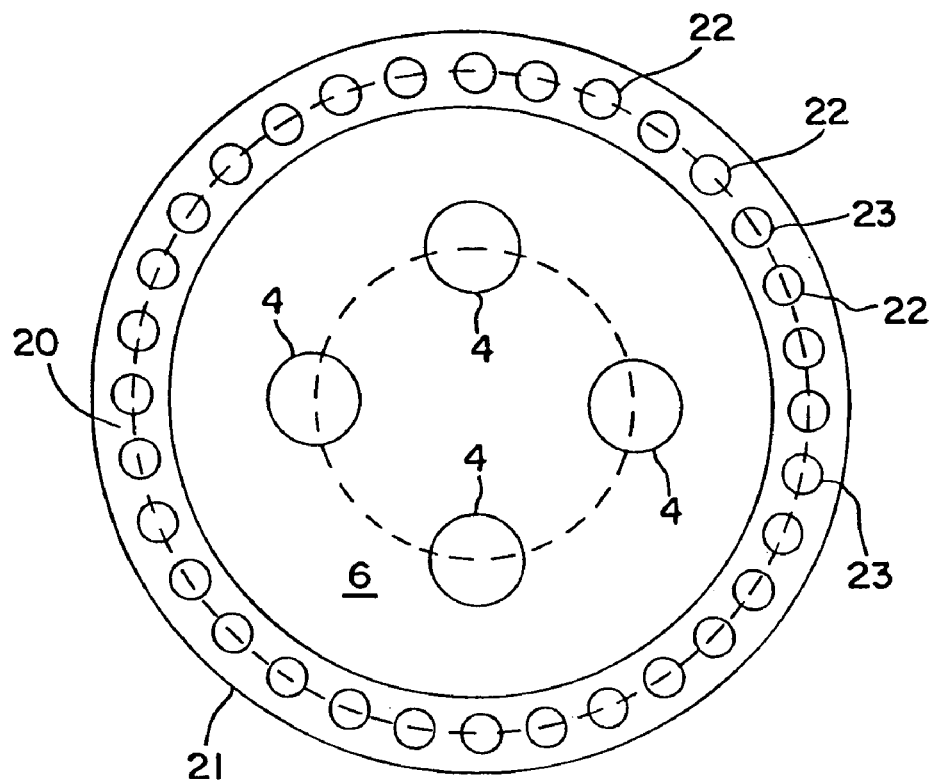
FIG. 1 is a head on view of one particularly preferred lance for use in the practice of this invention.

The invention is a method employing three different stages in a specified order whereby low carbon steel is produced by the provision of oxygen to molten steel from above the surface of the molten steel. The oxygen reacts with the carbon in the molten steel within a converter to produce carbon dioxide and carbon monoxide which bubble out of the molten steel, thus lowering the carbon concentration and producing low carbon steel.

The invention will be described in greater detail with reference to the drawings. The numerals in the drawings are the same for the common elements.

Figure 3:
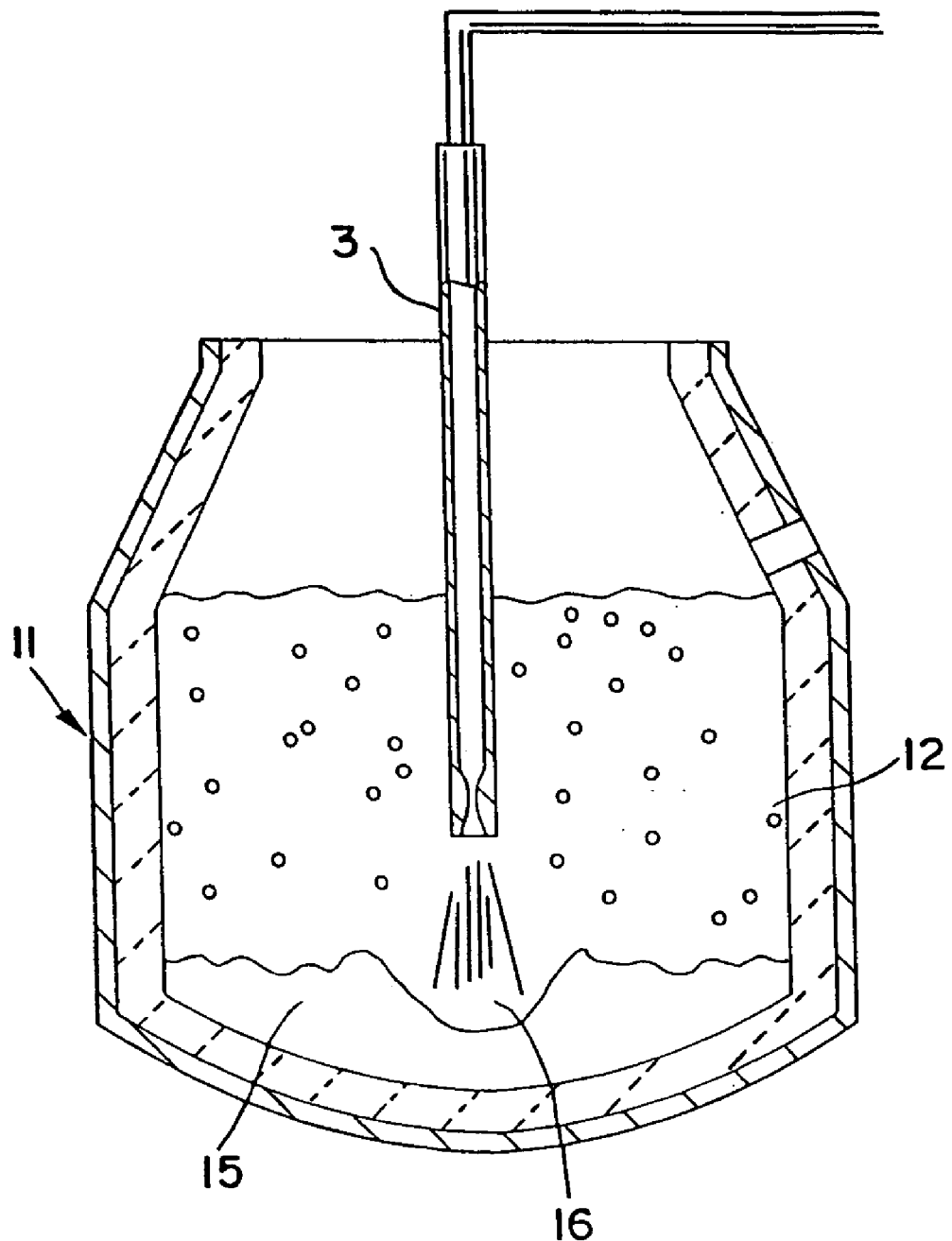
FIG. 3 is a generalized representation of the method of this invention in operation.

Typically about 75 percent of the iron charged to a BOF converter, such as converter 11 illustrated in FIG. 3, is hot metal from a blast furnace, and the remaining 25 percent of the iron charged to the converter is steel scrap. The charge 15 prior to the start of the three stage refining process of this invention has a carbon concentration greater than 0.30 weight percent, and typically has a carbon concentration within the range of from 4.0 to 4.5 weight percent.

The first stage of the refining method of this invention comprises from about 30 to about 70 percent of the refining period, i.e. about 30 to about 70 percent of the total oxygen provided to the molten steel during the refining method of this invention is provided during the first stage. Fluxes such as lime and dolomite are added at the beginning of the refining period to achieve the desired chemistry of the slag 12 and to neutralize the silicon dioxide which is formed during the first stage.

During the first stage of the refining method of this invention oxygen is provided in at least one stream from the lance tip or lance face to the molten steel. A gas shroud envelops the oxygen streams. Preferably the gas shroud extends from the lance tip to the molten steel surface. The gas shroud comprises oxygen and inert gas. Preferably the inert gas for the gas shroud is nitrogen.

Figure 2:
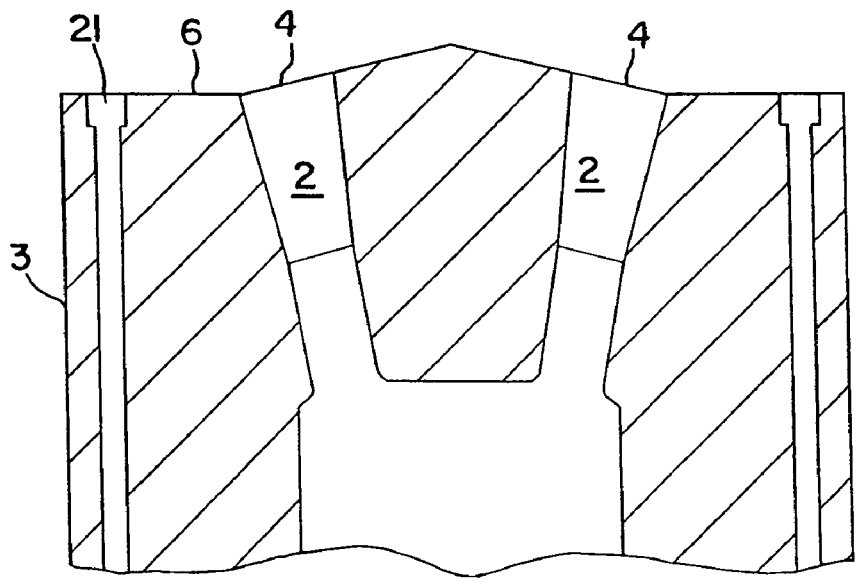
FIG. 2 is a cross sectional view of the particularly preferred lance for use in the practice of this invention.

FIGS. 1 and 2 illustrate a preferred apparatus for the practice of each of the three stages of the refining method of this invention. When using the apparatus illustrated in FIGS. 1 and 2, oxygen is provided from four nozzles 2 through four nozzle openings 4 on lance face 6 of lance 3. A ring 20 of ports in a recession 21 surrounds the nozzles at the lance tip, and the oxygen and inert gas for forming the gas shroud is provided from these ports. Preferably oxygen is provided from a first set of ports, e.g. 22, and inert gas is provided from a second set of ports, e.g. 23, which alternate with the ports of the first set.

The gas shroud around the oxygen streams causes the gas streams to form conventional jets. The conventional supersonic jets rapidly decay to subsonic velocities at which point the jet spreads with a half angle of about 10 degrees resulting in a less penetrating jet and a large area of surface contact with the surrounding atmosphere and the bath. Such oxygen streams are less likely to be reflected by unmelted scrap that is present during the beginning of the refining period which would cause damage to the lance or to the converter lining.

Conventional jets are turbulent and entrain a significant amount of surrounding atmosphere which contains a high percentage of carbon monoxide. The carbon monoxide is post combusted by the oxygen jets to carbon dioxide, and the resultant heat that is released increases the amount of scrap that can be melted which lowers cost and increases productivity. The additional oxygen contained in the annular gas shroud used with the conventional jets will also react with carbon monoxide and further increase the amount of post combustion which takes place. Bath mixing is less important during the initial portion of the blow because carbon levels and decarburization efficiency are high and the rates and amounts of iron loss to oxidation are low. Therefore, the reduced levels of bath mixing provided by conventional supersonic jets during this initial period does not significantly decrease yield.

After from 30 to about 70 percent of the oxygen for the decarburization of the molten steel has been provided to the molten steel, and the carbon content of the molten steel has been reduced to about 0.3 weight percent and generally to within the range of from 1.0 to 0.2 weight percent, the first stage of the refining method of this invention is concluded and the second stage is initiated. During the second stage of the refining method of this invention oxygen is provided in at least one stream from the lance tip or lance face to the molten steel. A flame shroud envelops the oxygen stream or streams. Preferably the flame shroud extends from the lance tip to the molten steel surface.

Any suitable fuel may be used to produce the flame shroud in the practice of this invention. Preferably the fuel is a hydrogen-containing fuel. Among such fuels one can name methane, natural gas, propane, butane, petroleum gas, coke-oven gas, gasified or vaporized fuel oils and hydrogen and mixtures thereof. Mixtures of hydrogen-containing fuels with carbon monoxide or inert gases can also be used.

When employing the apparatus illustrated in FIGS. 1 and 2, the fuel for the flame shroud is preferably provided from the ports through which the inert gas was provided during the first stage, and the oxygen for the flame shroud is preferably provided from the same ports it was provided for the gas shroud during the first stage. The refining oxygen during the second stage is provided through the same nozzles as during the first stage.

The flame shroud around the oxygen stream or streams during the second stage of the refining method of this invention causes the oxygen stream or streams to form coherent oxygen jets. Preferably the coherent jet or jets extend from the lance tip to the surface of the molten steel.

Basic oxygen furnaces often suffer from ejection of metal and slag from the furnace due to rapid reaction of oxygen and FeO in the slag with carbon, resulting in high rates of carbon monoxide evolution which entrain the metal and slag and carry it out of the vessel. This results in yield loss, build-up of frozen metal and slag on the mouth and cone of the furnace which requires periodic removal and associated loss of production, fume releases which may not be captured by the off-gas system, and possible damage to the BOF fume capture hood. It is often desirable to be able to melt as much heavy scrap such as skulls, hobs, pit scrap, etc. as possible in the BOF because of its lower cost. However, a lack of bath stirring and associated poor heat transfer can result in late melting or even unmelted scrap which will adversely affect chemistry control and overall furnace operation. Switching from conventional to coherent jets increases bath stirring and heat transfer and allows more heavy scrap to be used without encountering problems associated with late or incomplete melting.

As the refining blow proceeds in the BOF, the rate limiting step for carbon removal changes from the rate of oxygen injection (total $O_2$ flow rate through lance) to mass transfer of carbon within the bath. Switching from conventional to coherent jets increases the mass transfer rate of carbon in the bath because of the increased bath mixing provided by the more deeply penetrating jets. This results in more efficient carbon removal and less formation of FeO resulting in improved Fe yield. The specific point in the blow at which the switch from the first stage to the second stage is made is based on the silicon content of the hot metal and the relative importance of each of the above factors for both the conventional and coherent jet operating modes and overall optimization of furnace operation and cost.

After the second stage of the refining method of this invention, the molten steel has a carbon concentration generally less than 0.3 weight percent and typically within the range of from 0.3 to 0.02 weight percent. At this point the third stage of the refining method of this invention is initiated.

During the third stage of the refining method of this invention, inert gas, or oxygen and inert gas wherein the inert gas comprises at least 10 mole percent of the oxygen and inert gas, is provided in at least one stream from the lance tip or lance face to the molten steel. A flame shroud envelops the stream or streams. Preferably the flame shroud extends from the lance tip to the molten steel surface. When employing the apparatus illustrated in FIGS. 1 and 2, the flame shroud is formed in a manner similar to the manner that it is formed during the second stage of the refining method of this invention. The inert gas, or oxygen and inert gas, provided during the third stage of the refining method of this invention is provided through nozzles 2. The preferred inert gas employed during the third stage of the refining method of this invention is argon.

The flame shroud around the inert gas, or oxygen and inert gas, stream or streams during the third stage of the refining method of this invention causes the inert gas, or oxygen and inert gas, stream or streams to form coherent jets. Preferably the coherent jet or jets extend from the lance tip to the surface of the molten steel. At the conclusion of the third stage the molten steel has a carbon concentration less than 0.10 weight percent.

In FIG. 3, element 16 is a generalized representation of the central stream or streams, i.e. oxygen in the first and second stages and inert gas or oxygen and inert gas in the third stage, and the shrouds, i.e. gas shroud during the first stage and flame shroud during the second and third stages, employed in the practice of the refining method of this invention.

The use of the third stage of the practice of this invention in conjunction with the first and second stages serves to reduce inhomogeneous zones in chemical composition and temperature in the molten metal due to lack of proper mixing in the metal bath without excessive metal bath oxidation and slag oxidation. The beneficial effects of the improved mixing resulting from top-blown coherent jets of inert gas or oxygen-inert gas on low carbon heats include enhanced steel decarburization, decreased FeO content in the slag resulting in better iron yield and reduced slag-induced refractory erosion, reduced dissolved oxygen in the metal resulting in lower aluminum consumption in the ladle, higher manganese content in the metal resulting in lower consumption of ferromanganese, enhanced desulferization and dephosphorization, and reduced hydrogen pickup.

Figure 4:
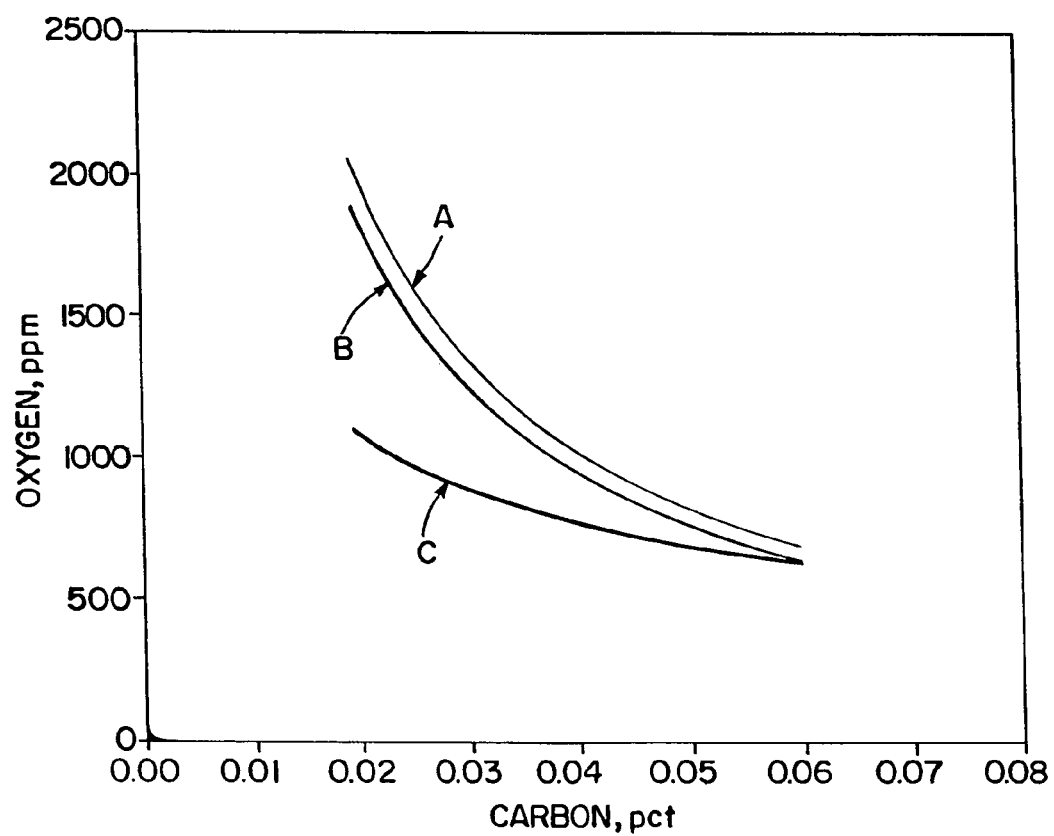
FIG. 4 is a graphical representation of results obtained with the practice of this invention compared with results obtained with two known practices.

In FIG. 4 there is shown a comparison of the level of oxygen dissolved in the refined steel as a function of the final level of dissolved carbon for three practices. Curve A illustrates that for a conventional bottom-stirred BOF process with conventional oxygen jets (40,000 $Nm^3/hr$) and argon blown through tuyeres in the converter bottom (800 $Nm^3/hr$). Curve B illustrates that for a bottom-stirred BOF process with coherent oxygen jets and with argon blown through tuyeres in the converter bottom. Curve C illustrates that for the invention which in this example used top blown coherent argon jets instead of blowing argon through tuyeres in the converter bottom. The level of dissolved oxygen reflects the amount of metallics which have been oxidized and lost to the slag It also reflects the amount of deoxidant, e.g. aluminum, which must be used to remove the dissolved oxygen and make the steel suitable for casting. As can be seen from the results reported in FIG. 4, the practice of this invention produces results which are superior to those achievable with known practices, particularly at very low carbon levels.

Although the invention has been described in detail with reference to certain preferred embodiments, those skilled in the art will recognize that there are other embodiments of the invention within the spirit and the scope of the claims.

What is claimed is:

1. A method for producing low carbon steel comprising the following sequential refining stages:
    (A) providing oxygen in at least one stream enveloped in a gas shroud from a lance to molten steel having a carbon concentration greater than 0.30 weight percent; thereafter
    (B) providing oxygen in at least one stream enveloped in a flame shroud from the lance to the molten steel; and thereafter
    (C) providing oxygen and inert gas in at least one stream enveloped in a flame shroud from the lance to the molten steel;
    said refining stages serving to produce low carbon steel.

2. The method of claim 1 wherein the gas shroud comprises oxygen and nitrogen.

3. The method of claim 1 wherein the gas shroud is provided from the lance through a single ring of ports around a plurality of nozzles.

4. The method of claim 1 wherein the oxygen is provided in a plurality of streams in both stage (A) and stage (B).

5. The method of claim 1 wherein the oxygen and inert gas is provided in a plurality of streams in stage (C).

6. The method of claim 1 wherein the inert gas employed in stage (C) is argon.

7. The method of claim 1 wherein the gas shroud in stage (A) extends from the lance to the molten steel.

8. The method of claim 1 wherein the flame shroud in stage (B) extends from the lance to the molten steel.

9. The method of claim 1 wherein the flame shroud in stage (C) extends from the lance to the molten steel.

10. A method for producing low carbon steel comprising the following sequential refining stages:
    (A) providing oxygen in at least one stream enveloped in a gas shroud from a lance to molten steel having a carbon concentration greater than 0.30 weight percent; thereafter
    (B) providing oxygen in at least one stream enveloped in a flame shroud from the lance to the molten steel; and thereafter
    (C) providing inert gas in at least one stream enveloped in a flame shroud from the lance to the molten steel;
    said refining stages serving to produce low carbon steel.

11. The method of claim 10 wherein the gas shroud comprises oxygen and nitrogen.

12. The method of claim 10 wherein the gas shroud is provided from the lance through a single ring of ports around a plurality of nozzles.

13. The method of claim 10 wherein the oxygen is provided in a plurality of streams in both stage (A) and stage (B).

14. The method of claim 10 wherein the inert gas is provided in a plurality of streams in stage (C).

15. The method of claim 10 wherein the inert gas employed in stage (C) is argon.

16. The method of claim 10 wherein the gas shroud in stage (A) extends from the lance to the molten steel.

17. The method of claim 10 wherein the flame shroud in stage (B) extends from the lance to the molten steel.

18. The method of claim 10 wherein the flame shroud in stage (C) extends from the lance to the molten steel.

* * * * *